3,374,260
PREPARATION OF S-ALKYL THIOL-HYDROXAMATE ESTERS

James B. Buchanan, Wilmington, Del., assignor to E. I. du Pont de Nemours and Company, Wilmington, Del., a corporation of Delaware
No Drawing. Filed Aug. 12, 1966, Ser. No. 571,963
10 Claims. (Cl. 260—453)

ABSTRACT OF THE DISCLOSURE

This application pertains to a process for preparing thiolhydroxamate esters. More particularly this application is directed to a process for preparing S-alkyl thiolhydroxamate esters of the formula (1) 

wherein

R is alkyl of 1 through 3 carbon atoms,
methoxyalkyl of 2 through 4 carbon atoms,
methylthioalkyl of 2 through 4 carbon atoms,
ethoxyalkyl of 3 through 5 carbon atoms or
ethylthioalkyl of 3 through 5 carbon atoms; and
$R_1$ is alkyl of 1 through 3 carbon atoms;

by the reaction of an acid salt of the corresponding S-alkyl imidic thiolester with an anhydrous acid salt of hydroxylamine in the presence of an alkali metal alkoxide and an alkanol of 1 through 4 carbon atoms.

The process of this invention can be illustrated generally in the following equation:

(A) 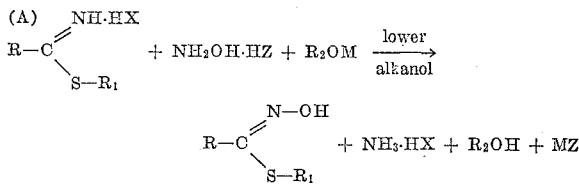

wherein R and $R_1$ are as in Formula 1, HX is any inorganic acid, HZ is an inorganic acid such as hydrogen chloride or sulfuric acid, $R_2$ is lower alkyl of 1 through 4 carbon atoms and M is an alkali metal.

Background of the invention

The process of this invention provides a safe, convenient method for the preparation of S-alkyl thiolhydroxamate esters in high yields. Related compounds have been prepared by a reaction disclosed in Houben and Pfankuch, Berichte Deutsch. Chem. Ges., 59, 2395 (1926) wherein ethyl acetohydroxamate was prepared from ethyl acetimidate hydrochloride and hydroxylamine hydrochloride in the presence of pyridine and ether. However, the process of this invention affords simplified product recovery and greatly improved safety as compared to the process of the above article. Moreover, the product of this invention is significantly purer and is obtained in surprisingly high yields as compared to said process.

Description of the invention

The process of this invention is carried out by adding the alkali metal alkoxide to an agitated mixture of the hydroxylamine salt and the S-alkyl thiolimidic ester salt in an alkanol solvent under essentially anhydrous conditions and at a temperature of from 10° to 60° C. These conditions are maintained after addition of the reactants until the reaction is complete. Completion of the reaction is indicated by the pH of the reaction mixture rising to above 2 and preferably to between 3.5 and 6. Ordinarily the reaction completion and the attendant pH are reached in from 1 to 8 hours. The S-alkyl thiolhydroxamate ester is then recovered by conventional means.

The S-alkyl thiolhydroxamate esters formed by the process of this invention are valuable reactants for the preparation of alkyl O-(alkylcarbamyl)thiolhydroxamates by reaction such as with alkyl isocyanates as disclosed in my copending application Ser. No. 361,277, filed Apr. 20, 1964.

Reactants

The hydroxylamine salt and alkali metal alkoxide reactants suitable for use in the process of this invention can be obtained from commercial sources or can be prepared by means well known in the art.

Representative of suitable alkoxides are the lithium, sodium and potassium methoxides, ethoxides, isopropoxides, n-propoxides, tert-butoxides, sec.-butoxides, isobutoxides and n-butoxides. Alkoxides of metals other than alkali metals can also be used, including the alkoxides of aluminum, calcium, magnesium and zinc.

Suitable hydroxylamine salts are the anhydrous salts such as the sulfate, acid sulfate, and hydrochloride. The most preferred salt is hydroxylamine hydrochloride.

The S-alkyl thiolimidic ester salts suitable for use in the process of this invention can be prepared by reacting a nitrile, an alkyl mercaptan, and an inorganic acid such as hydrogen chloride or hydrogen bromide in a nonhydrolytic solvent in a manner similar to that disclosed in Schmidt, Berichte Deutsch, Chem. Ges., 47, 2457 (1914). The reaction is illustrated by the following equation:

(B) 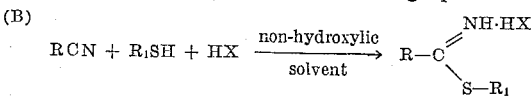

wherein R and $R_1$ are as in Formula 1 and HX is an inorganic acid such as hydrogen chloride or hydrogen bromide.

Preferred S-alkyl thiolimidic ester salts are those in which R is an alkyl group of one through three carbons and the most preferred S-alkyl thiolimidic ester salt is that in which both R and $R_1$ are methyl.

These reactants should be used in approximately stoichiometric amounts. The nitrile and alkyl mercaptan are dissolved in the non-hydroxylic solvent, and the acid is added while the reaction mixture is agitated. During addition the temperature is held at between −10 and 50° C., and this temperature is maintained while the reaction mixture is agitated for an additional 24 to 48 hours. At the completion of the reaction the S-alkyl thiolimidic ester salt which is formed will ordinarily crystallize out of solution and can conveniently be recovered such as by simple filtration. Such a crystalline product is usually of a sufficient purity for use directly in the reaction of Equation A.

Exemplary of nitriles suitable for use in the reaction of Equation B are acetonitrile, propionitrile, isobutyronitrile, n-butyronitrile, methylthioacetonitrile, 3-methoxypropiontrile, 3-ethoxypropionitrile, 3-methylthiopropionitrile, 3-ethylthiopropionitrile, 2-methyl-3-methylthiopropionitrile, and 4-methylthiobutyronitrile.

Representative of alkyl mercaptans suitable for use in the reaction of Equation B are the methyl, ethyl, isopropyl and n-propyl mercaptans.

As stated above, any inorganic acid is suitable for use in the reaction of Equation B and representative of these are such acids as hydrogen chloride, hydrogen bromide, and sulfuric acid. Of such acids it is ordinarily preferred to use hydrogen chloride or hydrogen bromide and hydrogen chloride is the most preferred acid.

The solvents suitable for use in the reaction of Equation B include all non-hydroxylic solvents including benzene, toluene, ethyl ether and alkanes such as pentane, and hexane or mixtures of such solvents. An especially suitable solvent is an excess of the nitrile reactant if it is a readily available commodity such as acetonitrile. Also the reaction may, if desired, be carried out in the absence of a solvent except to the extent that the stoichiometric amount of nitrile reactant acts as a solvent.

*Reaction conditions*

In preparing the S-alkyl thiolhydroxamate esters by the reaction of Equation A, the alkali metal alkoxide is added to an agitated mixture of the hydroxylamine salt and the S-alkyl thiolimidic ester salt in the alkanol solvent, with the reactants being used in approximately stoichiometric amounts. This order of addition is critical to avoid formation of undesired reaction products but variation of the amounts of reactants does not result in a departure from the concept of this invention.

The alkoxides can be added as a solid or in solution in the alkanol solvent. It is desirable to add the alkoxide as rapidly as is possible while maintaining the reaction temperature within the desired range.

It is ordinarily more convenient and economical to use sodium methoxide and it is preferred to add it as a solid which in many instances results in an improved yield.

The alkanol solvent should be one of the lower alkanols, such as, for example, methanol, ethanol, isopropanol, isobutanol, n-butanol, sec.-butanol, n-propanol, and tert.-butanol with absolute ethanol being the preferred solvent.

While it is recommended that the reactants used be essentially anhydrous, small amounts of water can be tolerated as, for instance, in the alkanol solvent. However, appreciable quantities of water are deleterious.

The reaction temperature is ordinarily controlled between 10° and 60° C. although some deviation from this range will not result in inoperability. Thus the temperature can range as low as 0° C. and as high as 70° C. without marked adverse effects. However, for most efficient operation it is preferred to maintain a temperature during reaction and any subsequent hold period of between 25° and 45° C.

The formation of the desired S-alkyl thiolhydroxamate ester takes place below a pH of 2. At this low pH formation of undesired amidoxime is largely suppressed. After the reaction is complete the pH gradually rises to between about 3.5 and 6 and at this stage the product is recovered. The pH referred to is an apparent pH measured using a glass electrode and a calomel electrode containing methanol saturated with potassium chloride.

The S-alkyl thiolimidic ester salt, hydroxylamine salt and alkoxide will ordinarily comprise from about 5 to 60% of the reaction mixture with the remainder being solvent. While these proportions are not critical, they are the most practical for efficient operation of the process.

The following examples illustrate the invention. Parts and percentages in these examples are by weight unless otherwise specified.

*Example 1*

While maintaining a temperature between 0° and 10° C., 66 parts of anhydrous hydrogen chloride is added to an agitated solution of 86 parts of methyl mercaptan in 216 parts of acetonitrile. This mixture is stirred at approximately 20° C. for 48 hours, the crystals are filtered off, washed with acetonitrile and dried to yield 169 parts of methyl thiolacetimidate hydrochloride, M.P. 92–93° C.

Twenty-nine and two tenths parts of hydroxylamine hydrochloride and 50.2 parts of the methyl thiolacetimidate hydrochloride are added to 158 parts of anhydrous ethanol. The resulting mixture is stirred at 30° C. while 21.6 parts of dry sodium methoxide is added over eighteen minutes. The mixture is stirred and the temperature is controlled near 30° C., initially by cooling and later by warming, for six hours, at which point the apparent pH is 4.9. The solids, mostly sodium chloride, are filtered off and washed with fresh ethanol. The filtrate and washings are combined and the solvent is distilled off under reduced pressure. The solid residue is mixed with 100 parts of water and the resulting solution is extracted with chloroform.

Removal of the chloroform by distillation yields 28.7 parts of methyl thiolacetohydroxamate, M.P. 90–92° C.

*Example 2*

To an agitated solution of 38.5 parts of propionitrile in 72 parts of diethyl ether and 66 parts of hexane is introduced 33.5 parts of methyl mercaptan followed by 25.5 parts of anhydrous hydrogen chloride, while the temperature is maintained at about 5° C. The mixture is stirred at 20–25° C. for 48 hours, at which time an oily phase containing the product has formed. The supernatant is poured off and the oil is triturated repeatedly with ether, causing crystals to form. The crystals are filtered and dried to yield 74.5 parts of methyl thiolpropionimidate hydrochloride.

Twenty-one and nine tenths parts of hydroxylamine hydrochloride and 42 parts of the methyl thiolpropionimidate hydrochloride are added to 91 parts of anhydrous ethanol. The resulting mixture is stirred at 30–32° C. while 16.5 parts of solid sodium methoxide is added over five minutes. The reaction mixture is stirred at 30–32° C. for several hours and is then mixed with 125 parts of water. The aqueous mixture is then extracted three times with 110 parts of chloroform, and the chloroform extracts are dried with magnesium sulfate. Removal of the chloroform yields 20 parts of methyl thiolpropionohydroxamate, M.P. 64–68° C.

*Example 3*

To a stirred solution of 25 parts of acetonitrile and 45.5 parts of 2-propanethiol in 72 parts of diethyl ether and 66 parts of hexane, held at 5° C., is introduced 22 parts of anhydrous hydrogen chloride. This mixture is stirred for 72 hours and then the supernatant is discarded and the oily product is triturated repeatedly with ether until it crystallizes. The crystals are filtered, washed with ether and dried, yielding 42.6 parts of isopropyl thiolacetimidate hydrochloride, M.P. 64–67° C.

Eighteen and three tenths parts of hydroxylamine hydrochloride and 38.6 parts of the isopropyl thiolacetimidate hydrochloride are added to 76 parts of anhydrous ethanol. The resulting mixture is stirred at 30–32° C. while 13.8 parts of sodium methoxide is added. This mixture is stirred at 30–32° C. for six hours and is then worked up as described in Example 2. After recrystallization from petroleum ether and cyclohexane, 15 parts of crystalline isopropyl thiolacetohydroxamate is obtained, M.P. 51–53.5° C.

*Example 4*

Ethyl thiolacetimidate hydrochloride, M.P. 141–142° C., is prepared by the procedure of Example 1.

Twenty-nine and two tenths parts of hydroxylamine hydrochloride and 55.8 parts of the ethyl thiolacetimidate hydrochloride are added to 158 parts of anhydrous ethanol. The resulting mixture is agitated at 30° C. while 21.6 parts of solid sodium methoxide is added over 10 minutes. This mixture is stirred at 30° C. for three hours and then at ambient temperature. The solvent is then distilled off at reduced pressure. The residue is mixed with 200 parts of water and extracted several times with chloroform. The chloroform extracts are combined and dried with magnesium sulfate and the chloroform is distilled to yield 32.7 parts of ethyl thiolacetohydroxamate, M.P. 106–108° C.

*Example 5*

To a stirred solution of 76 parts of n-propyl mercaptan in 300 parts of n-butyronitrile is added 38 parts of anhydrous hydrogen chloride at 0° C. The resulting mixture is stirred at 5–10° C. for three hours and then at ambient temperature for forty-eight hours. The excess n-butyronitrile is distilled under reduced pressure and the oily residue is stirred with diethyl ether at −40° C., which treatment induces crystallization. The crystals are filtered off, washed with cold ether and dried to yield 116 parts of n-propyl thiol - n - butyrimidate hydrochloride, M.P. 34.5–36° C.

Twenty-one and nine tenths parts of hydroxylamine hydrochloride and 55.8 parts of the n-propyl thiol-n-butyrimidate hydrochloride are added to 158 parts of anhydrous ethanol. The resulting mixture is stirred at about 30° C. while 16.2 parts of sodium ethoxide is added over ten minutes. The mixture is stirred at 30° C. for six hours and then the solvent is removed by distillation at reduced pressure. The solid residue (74 parts) is mixed with 200 parts of water, and extracted repeatedly with chloroform. After distilling off the chloroform, 35.8 parts of n-propyl thiol-n-butyrohydroxamate is obtained, M.P. 65.5–68° C.

*Example 6*

Seventy-three parts of hydroxylamine hydrochloride and 125.5 parts of methyl thiolacetimidate hydrochloride of Example 1 are mixed with 396 parts of methanol. This mixture is stirred at 33–38° C. while 54 parts of solid sodium methoxide is added over one hour and it is then stirred at 30–40° for several hours. The solids are filtered and washed with fresh methanol. The filtrate and washing are combined and the solvent distilled under reduced pressure. The solid residue is stirred with 145 parts of ice water, and the crystalline solids are filtered off and dried, yielding 42.7 parts of methyl thiolacetohydroxamate, M.P. 88–90° C.

*Example 7*

Twenty-nine and two tenths parts of hydroxylamine hydrochloride and 50.2 parts of methyl thiolacetimidate hydrochloride are added to 118 parts of anhydrous ethanol. The resulting mixture is stirred at 30° C. while 78 parts of a 27.8% solution of sodium methoxide in methanol is added over twenty minutes. The product is isolated by the procedure described in Example 1 and a good yield of methyl thiolacetohydroxamate is obtained.

*Example 8*

Twenty-nine and two tenths parts of hydroxylamine hydrochloride and 50.2 parts of methyl thiolacetimidate hydrochloride of Example 1 are added to 157 parts of tert-butanol. The resulting mixture is stirred at about 30° C. while 44.8 parts of potassium tert-butoxide is added in increments over ten minutes. The resulting mixture is stirred near 30° C. for five hours and then the solvent is removed by distillation at reduced pressure. The solid residue (81 parts) is mixed with 200 parts of water, and extracted three times with chloroform. After distilling the chloroform 22.0 parts of methyl thiolacetohydroxamate is obtained, M.P. 90–92.5° C.

*Example 9*

Forty-two and seven tenths parts of hydroxylamine sulfate and 62 parts of methyl thiolacetimidate hydrochloride are added to 202 parts of n-butanol. The resulting mixture is agitated and the temperature maintained in the range 40–44° C. while 26.7 parts of sodium methoxide is added over fifteen minutes. The mixture is stirred for an additional four hours at 40–45° C. Water is slowly added while a mixture of water and n-butanol is simultaneously distilled off under reduced pressure. When all the n-butanol has been removed, the aqueous system is chilled to 5° C. and the crystals are filtered off and dried, yielding 18.2 parts of methyl thiolacetohydroxamate, M.P. 90–92° C.

*Example 10*

Twenty-nine and two tenths parts of hydroxylamine hydrochloride and 55.8 parts of ethyl thiolacetimidate hydrochloride are added to 156 parts of n-propanol. The resulting mixture is agitated and the temperature maintained near 30° C. while 33.6 parts of potassium ethoxide is added over fifteen minutes. The mixture is stirred at 30° C. for three hours and at ambient temperature for eighteen hours. The solvent is then distilled off at reduced pressure. The residue is mixed with 200 parts of water and extracted several times with methylene chloride. After distilling off the solvent 20.7 parts of impure product is isolated. This material is stirred briefly with 50 parts of ice water and filtered. After drying, 18.4 parts of ethyl thiolacetohydroxamate is obtained.

Substitution of 15.2 parts of lithium methoxide for the 33.6 parts of potassium ethoxide in Example 10 gives the same product in similar yield.

*Example 11*

While maintaining a temperature between 0 and 5° C., 162 parts of hydrogen bromide is added to an agitated solution of 96 parts of methyl mercaptan in 392 parts of acetonitrile. The mixture is stirred for an additional two hours and the temperature is allowed to rise to 20° C. The crystals are filtered off, washed with acetonitrile and dried to yield 292 parts of methyl thiolacetimidate hydrobromide, M.P. 107–109° C.

Eighty-five parts of methyl thiolacetimidate hydrobromide and 35 parts of hydroxylamine hydrochloride are added to 158 parts of anhydrous ethanol. The resulting mixture is stirred at 30° C. while 27 parts of dry sodium methoxide is added over twenty minutes. The mixture is stirred at approximately 30° C. for four hours. The ethanol is removed by distillation and the solid residue is taken up in 200 parts of water. The resulting solution is extracted repeatedly with methylene chloride. The extracts are combined with magnesium sulfate and the solvent is distilled off, yielding 33.6 parts of methyl thiolacetohydroxamate.

*Example 12*

Fifty-five and eight tenths parts of ethyl thiolacetimidate hydrochloride and 29.2 parts of hydroxylamine hydrochloride are added to 158 parts of anhydrous ethanol. The resulting mixture is agitated at 50–52° C. while 21.6 parts of sodium methoxide is added over 15 minutes. The mixture is stirred at 50–55° C. for three hours. The ethanol is then distilled off at reduced pressure, and the residue taken up in 200 parts of water and extracted repeatedly with methylene chloride. The extracts are combined, dried with magnesium sulfate and the solvent is distilled off, yielding 26.5 parts of ethyl thiolacetohydroxamate.

*Example 13*

The reactants of Example 12 are combined at 20° C. and stirred together at 18–20° C. for six hours longer. After isolating by the procedure described in Example 12, 22.5 parts of ethyl thiolacetohydroxamate is obtained.

*Example 14*

To a stirred solution of 59 parts of 3-methoxy-propionitrile in 71 parts of ethyl ether and 63 parts of pentane is introduced 33.5 parts of methyl mercaptan followed by 25.5 parts of hydrogen chloride, while the temperature is maintained at 5–10° C. After prolonged stirring a product crystallizes out. The crystals are filtered and dried to yield 86 parts of methyl thiol-3-methoxypropionimidate hydrochloride, M.P. 80–85° C.

Thirty-seven parts of hydroxylamine hydrochloride and 86 parts of the methyl thiol-3-methoxypropionimidate hydrochloride are added to 158 parts of anhydrous ethanol. The resulting mixture is stirred at about 30° C. while 28 parts of dry sodium methoxide is added. After agitating this mixture at 30° C. for three hours and then at ambient temperature for a further three hours, 300 parts of water are added to the reaction mixture. The aqueous mixture is extracted three times with chloroform and the combined extracts are dried with magnesium sulfate. Removal of the chloroform yields 54 parts of solid methyl thiol-3-methoxypropionohydroxamate. After recrystallization from benzenecyclohexane this product melts at 70–75° C.

The following compounds are made in the manner of methyl thiol-3-methoxypropionohydroxamate of Example 14 by reacting an equivalent amount of one of the nitriles, listed below, in place of the 3-methoxypropionitrile of Example 14, with the indicated mercaptan and carrying out the otherwise similar chemical steps.

| Starting Materials | Product |
| --- | --- |
| Methoxyacetonitrile and methyl mercaptan. | Methyl-thiolmethoxyacetohydroxamate. |
| Methylthioacetonitrile and methyl mercaptan. | Methyl thiolmethylthioacetohydroxamate. |
| 3-methylthiopropionitrile and methyl mercaptan. | Methyl thiol-3-methylthiopropionohydroxamate. |
| 3-ethoxypropionitrile and methyl mercaptan. | Methyl thiol-3-ethoxypropionohydroxamate. |
| 3-ethylthiopropionitrile and methyl mercaptan. | Methyl thiol-3-ethylthiopropionohydroxamate. |
| Ethylthioacetonitrile and methyl mercaptan. | Methyl thiolethylthioacetohydroxamate. |
| 4-methylthiobutyronitrile and methyl mercaptan. | Methyl thiol-4-methylthiobutyrohydroxamate. |
| 4-ethoxybutyronitrile and methyl mercaptan. | Methyl thiol-4-etnoxybutyrohydroxamate. |
| 2-methyl-3-methylthiopropionitrile and methyl mercaptan. | Methyl thiol-2-methyl-3-methylthiopropionohydroxamate. |
| 3-methylthiopropionitrile and ethyl mercaptan. | Ethyl thiol-3-methylthiopropionohydroxamate. |
| 3-methoxypropionitrile and isopropyl mercaptan. | Isopropyl thiol-3-methoxypropionohydroxamate. |
| Methylthioacetonitrile and ethyl mercaptan. | Ethyl thiolmethylthioacetohydroxamate. |
| 4-methylthiobutyronitrile and isopropyl mercaptan. | Isopropyl thiol-4-methylthiobutyrohydroxamate. |

I claim:

1. A process for preparing S-alkyl thiolhydroxamate esters comprising (1) adding an alkali metal alkoxide selected from the group consisting of the lithium, sodium and potassium methoxides, ethoxides, n-propoxides, isopropoxides, n-butoxides, isobutoxides, sec-butoxides, and tert-butoxides to an agitated mixture maintained at a temperature of between 10° and 60° C. of (a) a solvent selected from the group consisting of methanol, ethanol, n-propanol, isopropanol, n-butanol, isobutanol, sec.-butanol and tert-butanol;

(b) an anhydrous hydroxylamine salt selected from the group consisting of hydroxylamine hydrochloride, hydroxylamine sulfate, and hydroxylamine acid sulfate.

(c) an S-alkyl thiolimidic ester salt of the formula

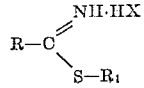

wherein

R is alkyl of 1 through 3 carbon atoms, methoxyalkyl of 2 through 4 carbon atoms, methylthioalkyl of 2 through 4 carbon atoms, ethoxyalkyl of 3 through 5 carbon atoms, or ethylthioalkyl of 3 through 5 carbon atoms;

$R_1$ is alkyl of 1 through 3 carbon atoms; and

HX is an inorganic acid selected from the group consisting of hydrogen chloride and hydrogen bromide;

(2) maintaining the temperature at between 10° and 60° C., and agitating the reaction mass until the reaction is complete; and (3) recovering the S-alkyl thiolhydroxamate ester which is formed.

2. The process of claim 1 in which the alkali metal alkoxide is sodium methoxide.

3. The process of claim 1 in which the solvent is absolute ethanol.

4. The process of claim 1 in which the hydroxylamine salt is hydroxylamine hydrochloride.

5. The process of claim 1 in which the temperature is maintained between 25° and 40° C.

6. The process of claim 1 in which the alkali metal alkoxide is sodium methoxide, the solvent is absolute ethanol, the hydroxylamine salt is hydroxylamine hydrochloride and the temperature is maintained between 25° and 40° C.

7. The process of claim 1 in which the S-alkyl thiolimidic ester salt is one in which R is alkyl of 1 through 3 carbon atoms.

8. The process of claim 6 in which the S-alkyl thiolimidic ester salt is one in which R is alkyl of 1 through 3 carbon atoms.

9. The process of claim 7 in which the S-alkyl thiolimidic ester salt is methyl thiolacetimidate hydrochloride.

10. The process of claim 8 in which the S-alkyl thiolimidic ester salt is methyl thiolacetimidate hydrochloride.

References Cited

UNITED STATES PATENTS 2,786,865   3/1957   Copenhaver _____ 260—566 X

OTHER REFERENCES

Roger et al.: Chemical Reviews, volume 61, pp. 201–202.

Pinner: Berichte der Deutschen Chemischen Gesellschaft, volume 17, pp. 184–186.

Houben et al.: Berichte der Deutschen Chemischen Gesellschaft, volume 59, p. 2932–2397.

CHARLES B. PARKER, *Primary Examiner.*

S. T. LAWRENCE III, *Assistant Examiner.*